United States Patent [19]

Barnett

[11] Patent Number: 5,416,705

[45] Date of Patent: May 16, 1995

[54] METHOD AND APPARATUS FOR USE OF ALPHANUMERIC DISPLAY AS DATA ENTRY SCRATCHPAD

[75] Inventor: Richard J. Barnett, Albuquerque, N. Mex.

[73] Assignee: Honeywell Inc., Minneaoplis, Minn.

[21] Appl. No.: 48,856

[22] Filed: Apr. 19, 1993

[51] Int. Cl.6 .............................................. B64C 19/02
[52] U.S. Cl. ...................... 364/424.06; 364/424.01; 364/439; 340/973; 340/974; 340/975; 340/825.54; 340/825.17; 340/905
[58] Field of Search .................. 364/424.06, 452, 453, 364/460, 439, 461, 410; 395/157, 153, 161; 340/963, 964, 986, 971, 973, 980, 500, 825.54, 825.36, 905, 825.44, 973, 974, 975, 825.17; 342/169, 455, 398, 32, 157, 168, 188, 45

[56] References Cited

U.S. PATENT DOCUMENTS

| | | | |
|---|---|---|---|
| 3,440,651 | 4/1969 | Fluhr et al. | 343/6.5 |
| 4,604,711 | 8/1986 | Benn et al. | 364/426.04 |
| 4,635,030 | 1/1987 | Rauch | 340/52 F |
| 4,821,216 | 4/1989 | Howell et al. | 340/973 |
| 4,845,495 | 7/1989 | Bollard et al. | 340/973 |
| 5,050,081 | 9/1991 | Abbott et al. | 364/426.04 |
| 5,065,360 | 11/1991 | Kelly | 395/800 |
| 5,089,816 | 2/1992 | Holmes, Jr. | 340/995 |
| 5,208,590 | 5/1993 | Pitts | 340/973 |
| 5,250,947 | 10/1993 | Worden et al. | 340/973 |
| 5,280,287 | 1/1994 | Evans | 342/45 |
| 5,301,268 | 4/1994 | Takeda | 395/157 |
| 5,329,277 | 7/1994 | Dougan et al. | 340/973 |

Primary Examiner—Kevin J. Teska
Assistant Examiner—Jacques H. Louis-Jacques
Attorney, Agent, or Firm—Ronald E. Champion; Craig J. Lervick

[57] ABSTRACT

An aircraft control and display system having a multi-function display for configuring the vehicle flight parameters and control of mission equipment utilizes a dedicated alphanumeric display as a scratchpad memory for temporarily displaying IFF mode commands encoded in alphanumeric form and for changing an IFF transponder code, thereby obviating the use of the multifunction display and the need thereby for reprogramming the mission functions. Codes entered in the alphanumeric display are validated against codes stored in a master control processor unit, whereby a prompt is provided to the operator to reenter the code in the event of an error in entry or an invalid code.

9 Claims, 5 Drawing Sheets

METHOD AND APPARATUS FOR USE OF ALPHANUMERIC DISPLAY AS DATA ENTRY SCRATCHPAD

BACKGROUND OF THE INVENTION

The United States Government has rights in this invention under Contract DAA J09-88-C-A113.

1. Field of the Invention

The invention relates generally to an aircraft integrated control and display system and, more particularly, to an alphanumeric radio frequency display, wherein alternate use is made of the display for scratchpad entry and verification of encoding of a code for a selected mode for activation of an IFF transponder.

2. Description of the Prior Art

Contemporary aircraft control and display systems (CDS) have adopted an integrated control panel, wherein a multifunction display may be configured to one of a plurality of control modes and used to configure the vehicle flight parameters and, in a military aircraft, mission equipment such as armaments and the mode of response of an Identification Friend or Foe (IFF) transponder. The CDS provides the primary man/machine interface for the aircraft. The CDS collects data for the various aircraft subsystems, organizes the data, and displays it to the crew upon demand.

Thus, the aircraft typically will be provided with at least one multifunction display which has selectable display screens or pages for configuring each mode of operation, a keyboard unit for data entry, a radio frequency display for indicating the operational frequency and status of communications equipment, and a mission control computer for interfacing the various control and display functions in accordance with a predetermined software control program, subject to modification in operation by the commands entered by the pilot and copilot.

In the present invention, an IFF transponder code is change by the keyboard entry. The processing of the IFF code data is a critical problem in view of the fact that a manual data entry is required to designate a code for a particular mode of IFF operation, and such entry on the multifunction display of the prior art required leaving the current display page, selecting the IFF display page, inputting a code for the desired IFF mode, verifying the correct entry and reentering the code if an error has been made, and then manually returning to the previously established display page. Where either the copilot/observer or the pilot leaves his flight page, reconfiguration of the aircraft or the mission equipment is often required. In high traffic areas, or in a combat or training situation, an excessive workload is thereby impressed upon the crew.

SUMMARY OF THE INVENTION

The present invention obviates the need for leaving the current display page and subsequently manually recalling the display page by using a separately available radio status display as a temporary IFF data display scratchpad, and then automatically returning to the normal radio status display after the transponder code has been correctly entered. The radio frequency field is temporarily used as the data entry scratchpad to provide feedback to the crew that the data were correctly entered. After the desired IFF mode code is entered, the frequency field will return to its original state and the mission control computer will the command the IFF transponder to the new mode code.

The invention comprises an aircraft control and display apparatus having a plurality of display devices, comprising at least a first display device for providing an alphanumeric display and a second display device for providing a graphical display, wherein the first display device is operative to display predetermined alphanumeric characters, and the second display device is selectively operative in a given one of a plurality of display modes, each mode defining a predetermined display screen, and further comprising means for overwriting the alphanumeric display in response to an operator command to provide a representation of a given command code, said means being operative to return to a previously selected alphanumeric display on the first display device without operator intervention after the command code has been executed. It comprises input means for data entry, means for storage of data entered by the input means, a master controller processor, and a signal processor operable in a plurality of command modes, and further comprises means for transferring data between the input means, the storage means, the master controller processor, the plurality of display means, and the signal processor. The input means, which may comprise a keyboard unit, operates on the master controller processor to initiate a given signal processor command mode by entering one of a predetermined plurality of alphanumeric command codes. The storage means may comprise a memory for storing the alphanumeric data entries and a plurality of predetermined alphanumeric codes for activating the signal processor in a selected one of the plurality of command modes corresponding to the alphanumeric command code, and for storing a control program for the master controller processor. The master controller processor compares the contents of the memory with respect to the entered alphanumeric data and the predetermined codes, thereby to energize the signal processor in a desired mode of operation upon coincidence of the encoded entry and one of the stored codes, and to overwrite the screen of the alphanumeric display device and display the entered data thereupon, and to provide an error signal on the alphanumeric display screen upon a failure of agreement of the compared data. The master controller processor determines whether a portion of the display screen will be dedicated to a predetermined alphanumeric display or as a working scratchpad display corresponding to the signal processor command code in response to the keyboard input and for return to the predetermined alphanumeric character display upon confirmation of the compared data entry and energization of the signal processor means in the commanded mode, whereby the second display device remains dedicated to a predetermined display mode during energization of the signal processor means.

DESCRIPTION OF THE PREFERRED EMBODIMENTS

Figure 1:
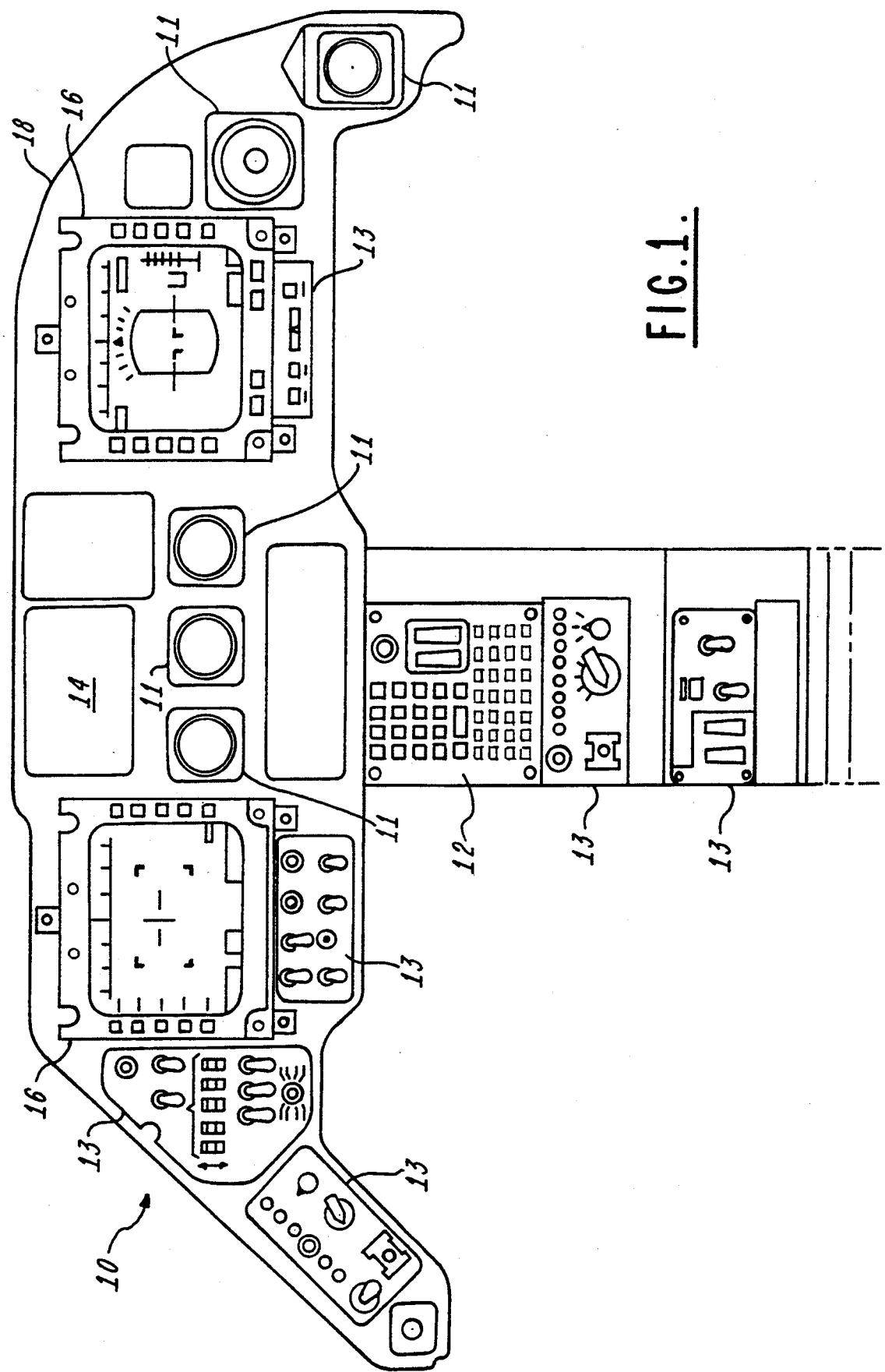
FIG. 1 is a pictorial view showing a typical layout of display instruments and panel controls as seen in the cockpit of a helicopter, and showing the disposition of the display screens of the present invention.

Referring now to the drawings, wherein like reference characters designate like or corresponding parts throughout the several figures, there is shown in FIG. 1 a pictorial layout of a typical display console 10 for a helicopter having a two-man crew, including a pilot (right side) and a copilot-observer (left side). The console may include a plurality of conventional electromechanical indicators 11 and switch panels 13. Of primary interest herein is the control display subsystem including the electronic display devices 14 and 16, of which display device 14 herein may comprise an LCD screen and display device 16 a cathode ray display screen. The cathode ray display screen may comprise a raster scan, vector scan or a combination of vector and raster scan, as is well known to those skilled in the art.

Figure 4:
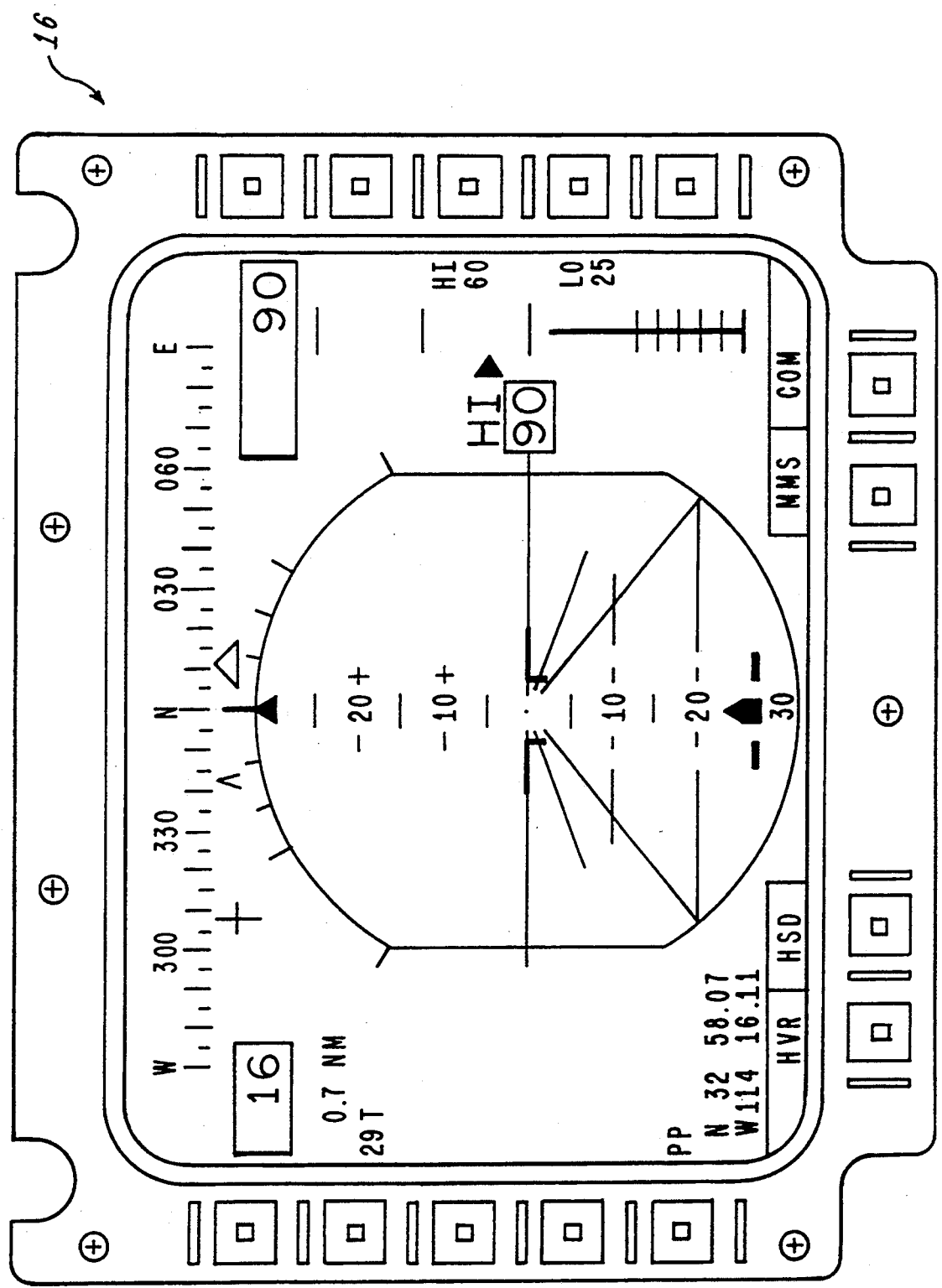
FIG. 4 is a representation of a multifunction display screen as used with the present invention.

Display device 16 is a multifunction display apparatus, capable of presenting a plurality of situation and command displays, each of which may be referred to as a "page". Two such displays are required; one for the pilot and one for the copilot. In operation, a page is selectively displayed in accordance with mission requirements. Thus, for example, FIG. 4 shows a multifunction display which may incorporate indicia for aircraft attitude, radar and barometric altitude, airspeed, and other essential navigational information. Other display pages are available for setup and maintenance, communications, cautions, warning and advisories, and in a military aircraft, weapons control and countermeasures.

Figure 3:
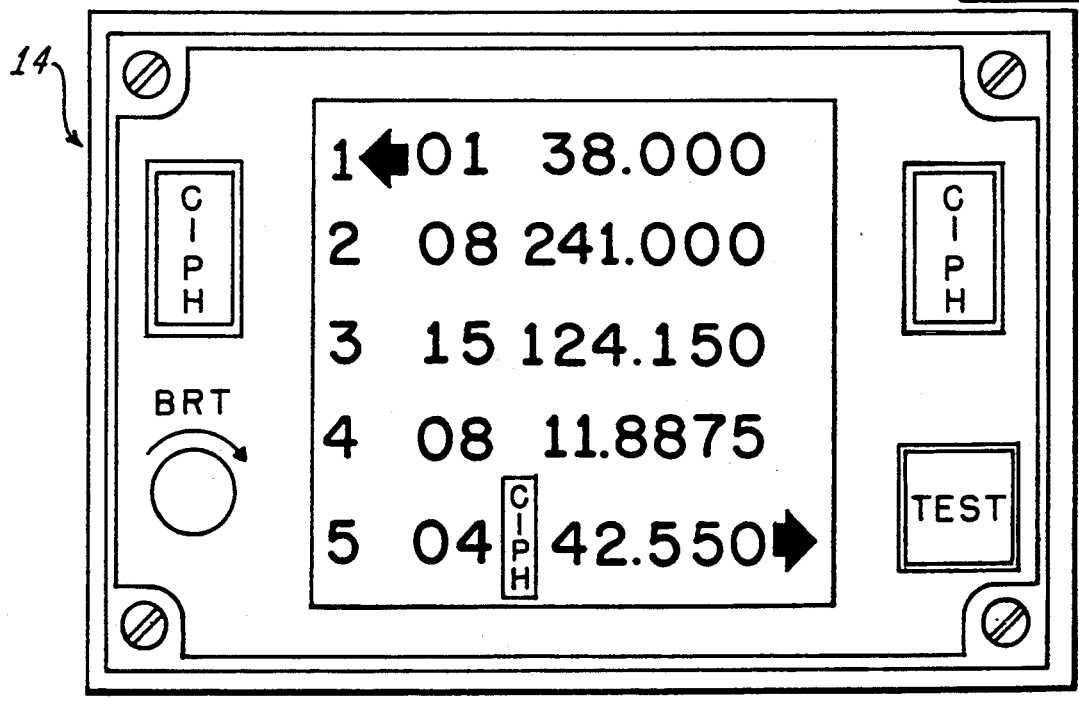
FIG. 3 is a plan view of an alphanumeric display screen of the present invention.

LCD display device 14 provides essentially an alphanumeric display screen for remotely indicating the frequency and status of onboard communications radios. Display information is presented to both the pilot and copilot. FIG. 3 is illustrative of a typical such display screen, here showing the frequency settings of five radios, and an arrow denoting which radio is operative as selected by the pilot or copilot.

Figure 2:
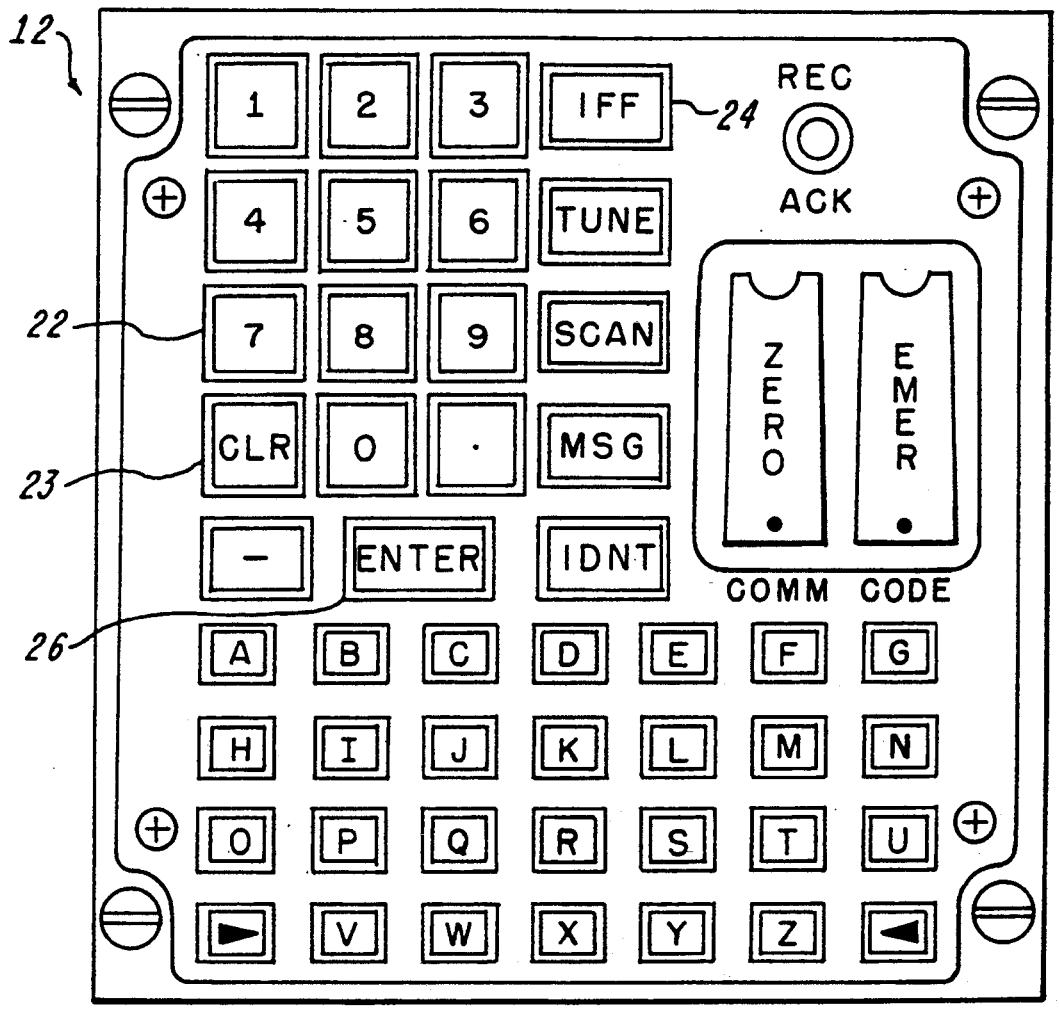
FIG. 2 is a plan view of a keyboard for controlling the display input commands.

The primary interface device for data entry into the control display subsystem is keyboard 12, shown in FIG. 2. Its main function is to convert discrete switch data into a serial data stream and provide serial data to the master control processing unit, to be described. A keypad 22 is used to enter data as required by prompts on the multifunction display 16. An ENTER key 26 is used depressed to complete data entry, and a CLEAR key 23 to clear incorrect input data. IFF key 24 is used to initiate entry of an IFF mode code. Other keys may be used in a conventional manner for cursor movement and alphanumeric entry of data inputs.

Figure 5:
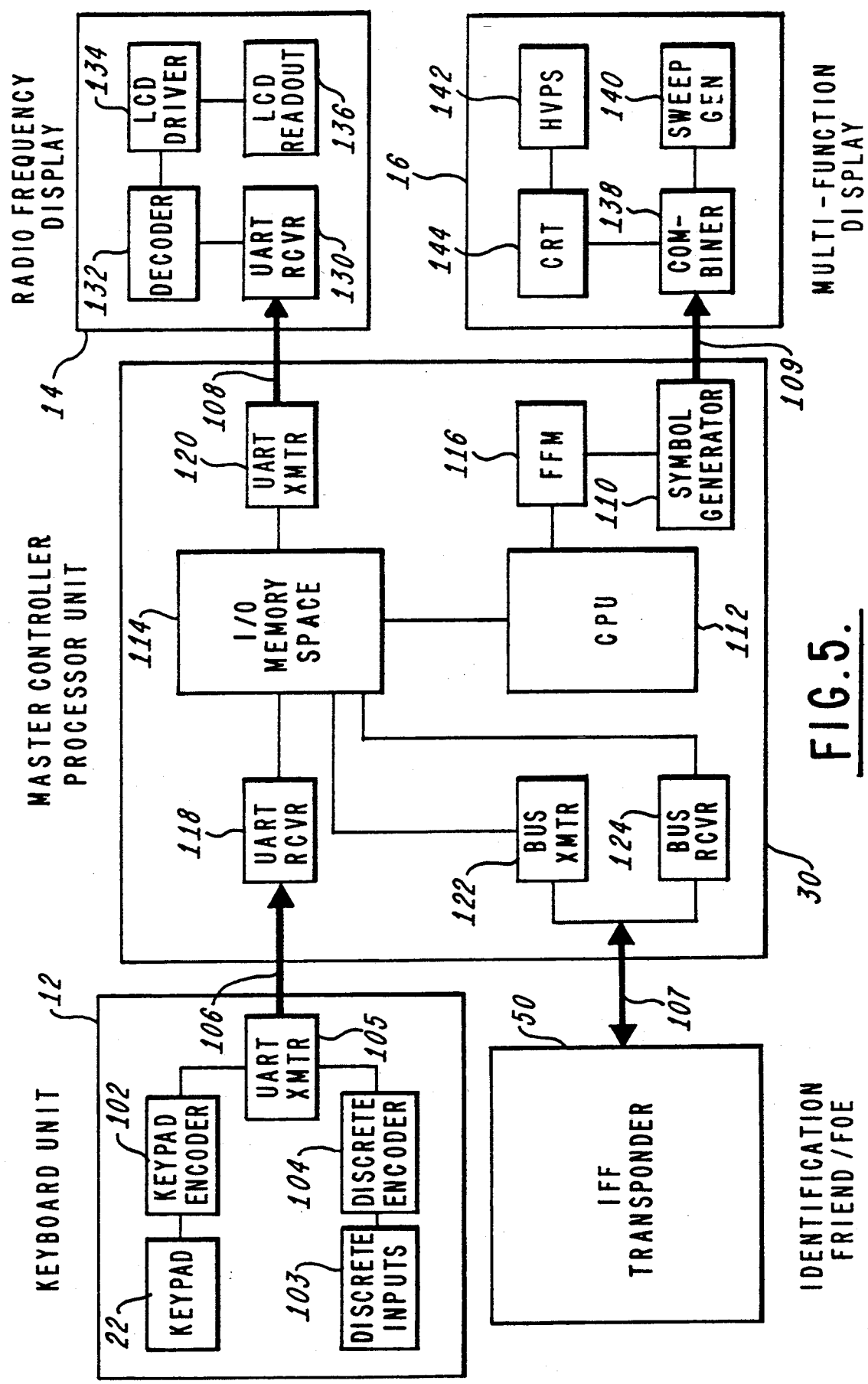
FIG. 5 is a schematic block diagram showing the structure and signal flow in the display system of the present invention.

Referring now to FIG. 5 there is shown a block diagram of the display control system. It comprises a keyboard unit 12, a radio frequency display device 14, a multifunction display device 16, a master controller processor unit 30, and an IFF transponder 50. While an IFF transponder has been shown for illustrative purposes, this is not to be considered as limiting, as other end devices responsive to control from the keyboard unit may be substituted therefore.

Considering the keyboard unit 12 in greater detail, it is seen to be comprised of a keypad 22, keypad encoder 102, discrete (hardwired switch) inputs 103, discrete encoder 104, and universal asynchronous receiver/transmitter (UART) 105. These components are standard devices well known in the art. See, for example, W. H. Buchsbaum, *Encyclopedia of Integrated Circuits*, Prentice Hall, Inc.

Keypad 22 provides digital signals corresponding to a given key when depressed. The key signal is coupled to keyboard encoder 102, which scans the keyboard to determine which key is pressed, and provides a binary output in parallel form unique to the given key to UART 105. UART 105 accepts the parallel data and converts it to a serial data stream for transmission on bus 106 to the master controller processor unit (MCPU) 30. In a similar manner, discrete inputs in binary form are coupled to discrete encoder 104 and coupled to UART 105 which transmits the serial data to MCPU 30.

MCPU 30 provides control of data bus 106, symbol generator processing functions, data processing, and subsystem interface circuits. It comprises a central processing unit 112, input/output (I/O) memory space 114, a full-field memory for writing into symbol generator 110, interface UART receiver 118 coupled to keyboard unit 12, , interface UART transmitter 120, coupled to display device 14, and bus transmitter 122 and bus receiver 124 coupled on a MIL-STD-1553B standard data bus to identification transponder 50. UART receiver 118 is coupled to receive serial data from UART transmitter 105. UART transmitter 120 is coupled through data bus 108 to transmit serial data to UART receiver 130 of display device 14. CPU 112 is further provided with a resident program stored in a program memory (not shown).

Display device 14 comprises UART receiver 130, coupled to decoder 132 which converts the serial data to a form for activating LCD driver 134. Driver 134 is coupled to energize LCD readout display 136.

Multifunction display device 16 comprises a high voltage power supply coupled to a cathode ray tube (CRT) 144. Sweep and timing signals from sweep generator 140 are applied to combiner 138 for synchronization with symbol data transmitted on bus 109 and coupled to appropriate inputs of CRT 144.

Identification transponder 50 is a conventional IFF transponder capable of operation in a plurality of modes for identification of an aircraft. In the present application, it is desirable for an operator to be capable of entering a code which enables a given mode of IFF operation. This code is entered on keyboard unit 12, as will be described. The application to IFF is to be considered exemplary and not limiting, since the scratchpad use of the display unit 14 is applicable to other devices utilizing alphanumeric control and display.

Figure 6:
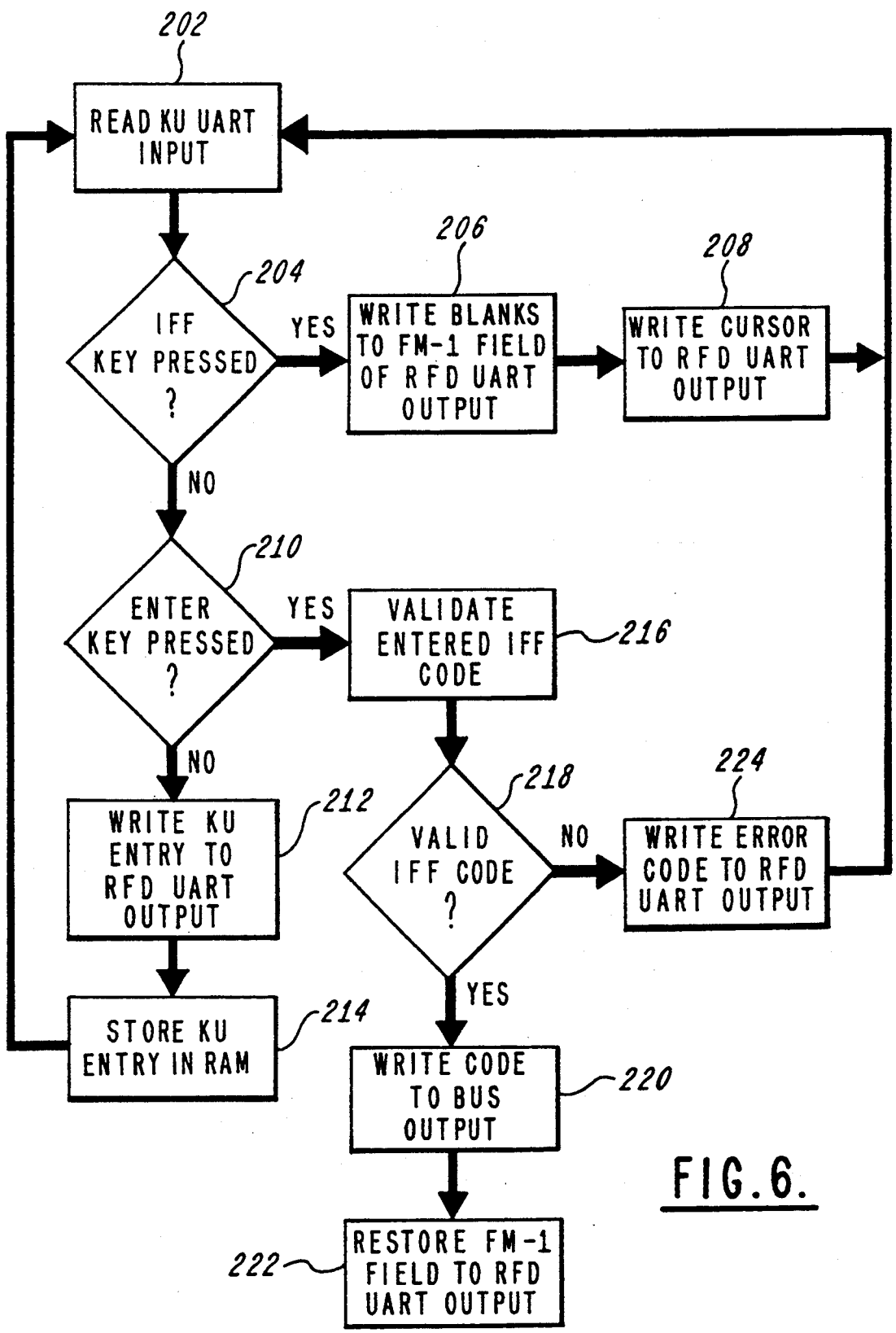
FIG. 6 is a flow chart illustrating the operation of the master control processing unit of the present invention.

In accordance with the invention, operation is illustrated by the flow chart of FIG. 6. As shown therein, a simplified data entry program begins its operation by awaiting characters for storage or a signal to output stored characters. Upon starting the program at step 202, selected keys of keyboard 12 are depressed and an input routine is executed by MCPU 30. When a key has been pressed, the program in CPU 112 provides an input to UART transmitter 105 for initiating a keystroke output transfer to the I/O memory space. MCPU 30 reads the data from UART receiver 118 at step 204 and stores the data in memory 114. If the IFF key has been pressed, the program controls the processor at step 206 to execute an output routine and transmit via UART transmitter 120 and receiver 130 instructions to overwrite a given field of alphanumeric characters on LCD readout 136 with "blanks", and further writes a cursor on the LCD display screen which indicates to the operator that a response is awaited.

If the key accessed at location 204 is determined not to be the IFF key, the program proceeds to step 210 to identify whether the ENTER key has been pressed. In the normal sequence of events, the ENTER key will not be pressed until an alphanumeric entry has been made. Thus, in the absence of identifying that the ENTER key was pressed, the program will continue to location 212.

At location 212 an alphanumeric keyboard entry will be transmitted to MCPU 30 and written to LCD 136. At location 214 it is stored in random access memory in MCPU 30. At step 214 the program halts further operation and awaits receipt of a command to enter the data into the IFF transponder.

Returning to steps 202, 204, and 210 in sequence, if the ENTER key has been pressed, MCPU 30 proceeds to location 216 to compare the alphanumeric entry with one of the valid codes stored in CPU ROM. If the code is found to be valid at location 218, the processor writes the code to bus transmitter 122 for transmission over data bus 107 to activate transponder 50 in a predetermined mode. If the code at location 218 is invalid, the processor reverts to location 224 and writes an error code to LCD display 136. In the event of an error in entry, or an invalid entry, activation of the transponder is denied, the program branches back to the input routine as previously described, and the LCD screen is blanked for reentry of a new sequence of alphanumeric characters.

It may be seen that by using the LCD display as a temporary "scratchpad" for displaying the alphanumeric transponder codes, there is no need to disrupt the multifunction display. No additional hardware is required, and the desired functions may be accomplished by reprogramming the software in accordance with the flow chart of FIG. 6.

While the invention has been described in its preferred embodiments, it is to be understood that the words which have been used are words of description rather than limitation and that changes may be made within the purview of the appended claims without departing from the true scope and spirit of the invention in its broader aspects.

Embodiments of an invention in which an exclusive property or right is claimed are defined as follows:

1. Aircraft control and display apparatus having a plurality of display devices, operative for overwriting a display screen, and for returning to a predetermined display without operator intervention, comprising:
   first display means having a display screen for providing an alphanumeric display and operative to display predetermined alphanumeric characters,
   second display means having a display screen for providing a graphical display and operative in a given one of a plurality of selectable display modes, each said mode defining a predetermined display screen,
   input means for data entry, for overwriting said alphanumeric display in response to an operator command,
   storage means for storage of data entered by said input means,
   signal processor means for receiving and transmitting encoded radio-frequency signals in selectable modes in response to an encoded alphanumeric command signal,
   master controller processor means for controlling said storage means and said first and second display means, and for activating said signal processor means to operate in one of a plurality of command modes, and
   transfer means for transferring data entered by said input means to said master controller processor means, said storage means, said first and second display means and said signal processor means,
   wherein said input means comprises means operating on said master controller processor means for initiating a given display mode and means for entering alphanumeric data, including predetermined alphanumeric codes for activating said signal processor means in a selected one of said plurality of command modes,
   said storage means comprises means for storing said input alphanumeric data and for storing said predetermined alphanumeric data codes corresponding to said plurality of command modes of said signal processor means, said predetermined alphanumeric codes adapted for activating said signal processor means in a selected one of said plurality of command modes corresponding to a given alphanumeric code, and means for storing a control program for said master controller processor means,
   wherein said master controller processor means comprises means for comparing the contents of said storage means with respect to said entered alphanumeric data and said predetermined alphanumeric codes, means for energizing said signal processor means in a predetermined mode of operation upon coincidence of said entered alphanumeric data and a corresponding one of said predetermined alphanumeric codes, and means to overwrite existing alphanumeric data on the display screen of said first display means and to display the entered data thereupon, and means for providing an error signal to said first display means upon a failure of agreement of said compared data,
   said master controller processor means further comprising means for designating whether a portion of said display screen of said first display means is dedicated to said predetermined alphanumeric display or to said entered alphanumeric data as a working scratchpad display in response to said input means, and for return to said alphanumeric display upon confirmation of said compared data entry and energization of said signal processor means in said predetermined mode of operation, wherein said display screen of said second display means remains dedicated to a selected display mode during energization of said signal processor means.

2. Apparatus as set forth in claim 1, wherein said input means comprises keyboard entry means and said transfer means further comprises means for transferring data entered therein to said storage means upon receipt of an initiating signal.

3. Apparatus as set forth in claim 2, wherein said transfer means further comprises means associated with said storage means for receiving said transferred data and for transferring said data to said first display means, means associated with said first display means for receiving said transferred data from said storage means and applying said transferred data to provide a temporary visual display on a predetermined portion of said first display means and means for transferring a signal corresponding to a confirmed predetermined mode of energization to said signal processor means.

4. Apparatus as set forth in claim 3, wherein said alphanumeric data entry comprises an IFF mode control code, said signal processor means comprises an IFF transponder, and said selected display means is adapted to overwrite a given page display so as to indicate the applied alphanumeric data entry.

5. Apparatus as set forth in claim 4, wherein said input means further comprises input key means for initiating a data input transfer via said transfer means to said first display means.

6. Apparatus as set forth in claim 5, wherein said input means further comprises control key means for initiating a data output transfer via said transfer means to said signal processing means.

7. Apparatus as set forth in claim 1, wherein said master controller processor means is adapted for controlling said storage means, said first display means, and said signal processing means to operate in one of a plurality of modes and is programmed to operate in:

a first mode wherein data entered by said input means is stored in said storage means and said transfer means accesses data from said storage means for transfer to said first display means, and said display means is initially operative to display a predetermined alphanumeric sequence of characters independent of said predetermined alphanumeric codes, a second mode wherein said controller processor means is programmed to accept data inputs which coincide with corresponding data words stored in said storage means and to reject data inputs which are not coincident with ones of said stored data words in a predetermined encoded pattern, wherein rejected data inputs result in an error display on said first display screen and accepted data inputs result in a corresponding alphanumeric display on said screen, and a third mode wherein accepted data inputs result in commanding operation of said signal processor means in a predetermined mode of operation and in erasing said alphanumeric display corresponding to a keyboard input from said first display screen and restoring said predetermined sequence of characters to said display screen.

8. An IFF display and processing system, comprising:

first display means for displaying a plurality of alphanumeric digits, second display means for displaying in graphical form a given display page from a plurality of selectable display pages, IFF transponder means for receiving and transmitting predetermined sequences of radio-frequency signals in response to a command signal, keyboard input means for providing an input alphanumeric command code, and computer processor means, comprising a microprocessor, storage means, and transfer means for controlling said first and second display means and for inhibiting display of a portion of a given alphanumeric display on said first display means and for writing thereupon said input alphanumeric command code and energizing said IFF transponder means in accordance with said code when said code is in agreement with one of a predetermined plurality of codes adapted for enabling said transponder, and for writing an error message on said first display means when said applied code is in disagreement with said predetermined plurality of codes, and for restoring said portion of said alphanumeric display upon energization of said IFF transponder, said display page of said second display means being independent of an applied IFF command signal in alphanumeric form.

9. A method for controlling an IFF display and processing system, comprising:

providing a first display screen for displaying a plurality of alphanumeric digits, providing a second display screen for displaying a plurality of graphical and alphanumeric images;

providing a keyboard for manual input of alphanumeric signals encoded in digital form, providing a computer processing unit for reading keyboard entries and enabling an IFF transponder in a predetermined operational mode in accordance with said alphanumeric signals, writing a predetermined alphanumeric pattern upon said first display screen, entering a command to said computer processing unit by selectively activating predetermined keys on said keyboard, providing a discriminant program associated with said computer processing unit for recognizing an alphanumeric entry as an IFF encoded signal or as an error signal, writing an error signal on said first display screen overlaying said predetermined alphanumeric pattern in accordance with recognition of an entered error signal, writing an alphanumeric pattern on said first display screen overlaying said predetermined alphanumeric pattern in accordance with recognition of a valid encoded IFF signal, and activating said IFF transponder in a predetermined mode of operation corresponding to said recognized alphanumeric pattern and rewriting said predetermined alphanumeric pattern upon said first display screen, whereby the second display screen remains undisturbed during the entry of alphnumeric characters upon first display screen.

* * * * *